United States Patent Office 3,729,447
Patented Apr. 24, 1973

3,729,447
FLAMEPROOF HIGH MOLECULAR AROMATIC POLYESTER-CARBONATES
Ulrich Haberland, Krefeld-Bockum, Günther Lenz, Krefeld, Hermann Schnell, Krefeld-Uerdingen, and Kurt Weirauch, Krefeld-Bockum, Germany, assignors to Bayer Aktiengesellschaft, Leverkusen, Germany
No Drawing. Filed Feb. 25, 1971, Ser. No. 119,045
Claims priority, application Germany, Feb. 28, 1970, P 20 09 494.4; Oct. 26, 1970, P 20 52 378.8
Int. Cl. C08g 17/13
U.S. Cl. 260—47 XA    8 Claims

ABSTRACT OF THE DISCLOSURE

High molecular weight linear polyester-polycarbonates are provided which have recurring structural units of the general formulae:

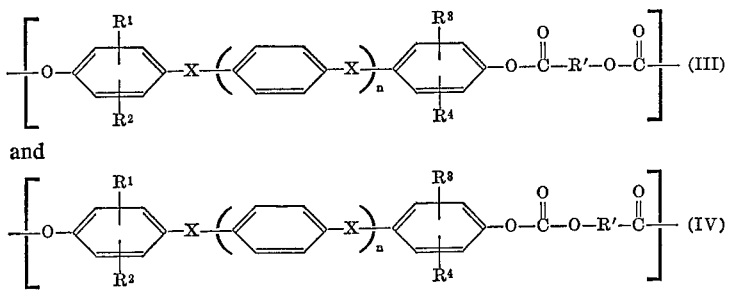

in which general formulae:

R' is a divalent aromatic radical;
$R^1$, $R^2$, $R^3$ and $R^4$, which may be the same or different, each denote a hydrogen chlorine or bromine atom or an alkyl radical having one to four carbon atoms;
X is a single bond, or an alkylene, alkylidene or isoalkylidene radical each of which may have one to five carbon atoms, or a cycloalkylene or cycloalkylidene radical each of which contains five to fifteen carbon atoms, a

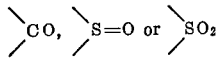

linkage or an oxygen or sulphur atom; and
n is 0 or 1, and to shaped articles, films and foils manufactured from them.

The new high molecular linear aromatic polyester-carbonates are polycondensation products, in the molecular chains of which divalent aromatic radicals are bonded to one another both by carboxylic acid ester groups and by carbonic acid ester groups, which possess improved properties.

According to British patent specification No. 870,095 it is possible, inter alia, to react mixtures of a bisphenol and an aromatic hydroxycarboxylic acid in pyridine with phosgene. The polyester-carbonates thus obtainable are characterized by certain recurrent structural units including those of the general formulae:

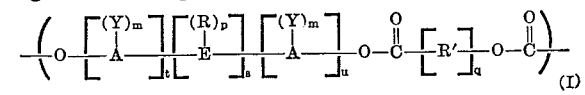   (I)

and

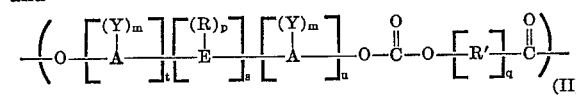   (II)

in which
A is a divalent aromatic radical, for example phenylene, bisphenylene, naphthylene and the like;
E is an alkylene, alkylidene or cycloalkylene or cycloalkylidene radical;
R is hydrogen or an alkyl, aryl, aralkyl or cycloalkyl radical;
R' is an alkylene, alkylidene, cycloalkylene, cycloalkylidene or arylene radical;
Y is halogen, a nitro group, or an alkyl or aryl group;
m is an integer from zero up to the number of positions on A available for substitution;
p is an integer from zero up to the number of positions on available for substitution;
t is an integer $\geq 1$;
s is 0 or 1;
u is any integer including 0; and
q is preferably 1.

While these known polyester-carbonates only have moderately good properties, especially with regard to their mechanical strength, it has now been found that high molecular polyester-carbonates can be manufactured which, although containing structural units generally similar to those disclosed in the British Pat. 870,095, possess a significantly better pattern of properties than those obtainable by the process described therein, especially if they are distinguished therefrom in containing the residues of co-condensed halogenated p-hydroxy-benzoic acid, they have, inter alia, an increased flameproof character.

It is therefore an object of this invention to provide polyestercarbonates which are devoid of the disadvantages of the prior art.

Another object of this invention is to provide polyester-carbonates which have greatly improved and excellent properties, especially with regard to mechanical strength.

A further object of this invention is to provide polyester-carbonates whch have increased heat and flame resistant characteristics.

Still another object of this invention is to provide polyestercarbonates which have generally excellent mechanical properties such as, for example, notched impact strength.

Yet another object of this invention is to provide copolyestercarbonates which have excellent stability to saponification and high glass transition temperature.

A still further object of this invention is to provide copolyestercarbonates which can be manufactured and isolated easily and which can be processed in the melt to yield shaped articles or in solution in organic solvents to yield clear transparent films and foils.

Yet a further object of this invention is to provide an improved process for preparing the copolyester-carbonates of this invention.

The foregoing objects and others which will become apparent from the following description are accomplished in accordance with this invention, generally speaking, by providing new high molecular weight linear polyester-polycarbonates having recurring structural units of the general formulae:

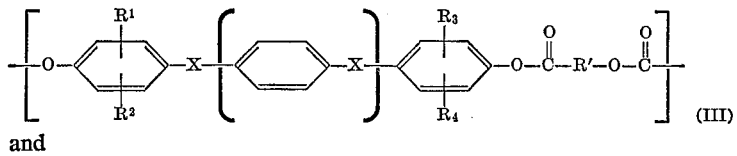

and

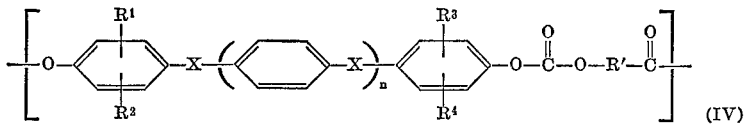

in which

R' is a divalent aromatic radical especially —O—R'— is

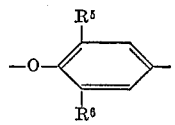

$R^1$, $R^2$, $R^3$ and $R^4$ are identical or different and each denotes hydrogen, chlorine or bromine atom or a $C_1$ to $C_4$ alkyl radical;

$R^5$ and $R^6$ are identical or different and each denotes a hydrogen, chlorine or bromine atom, at least one substituent $R^5$ and $R^6$ denoting a chlorine or bromine atom;

X is a single bond an alkylene, alkylidene or isoalkylidene radial each of which contains one to five carbon atoms, a cycloalkylidene or cyloalkylene radical each of which contains five to fifteen carbon atoms, a

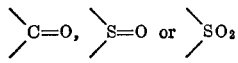

radical, or an oxygen or sulphur atom; and
n is 0 or 1.

The present invention also provides a process for the production of these new polyester polycarbonates in which substantially equimolar amounts of a halogenocarbonic acid ester-carboxylic acid halide of an aromatic hydroxycarboxylic acid or the formula:

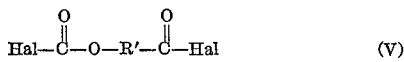

in which Hal is a halogen atom, preferably chlorine and R' is a divalent aromatic radical, especially —O—R'— is

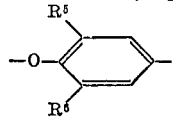

as defined above, is reacted with an aromatic dihydroxy compound of the formula:

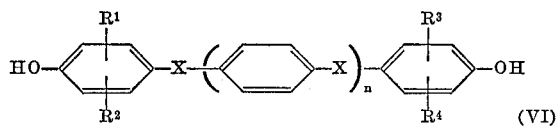

in which $R^1$, $R^2$, $R^3$, $R^4$, X and n are as already defined herein, are reacted, optionally in the presence of a catalyst, at a temperature between —20° and +150° C.

The term "alkylene radical" as used in this specification means a divalent straight or branched-chain saturated hydrocarbon radical; the terms "alkylidene radical" and "isoalkylidene radical" as used in this specification to mean a divalent straight or branched chain saturated hydrocarbon radical in which both free valencies are on the same carbon atom.

By contrast to the products of British Pat. 870,095, the new polyester-carbonates of this invention are easily soluble in many organic solvents, such as methylene chloride, chloroform, toluene, chlorobenzene, cyclohexanone and dimethylformamide, and clear, transparent films and foils can be cast from such solutions. Equally, the new products 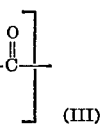 can be processed by means of injection molding machines or screw extruders to give clear, colorless shaped articles of all kinds. A particularly advantageous and surprising property of these new products is the fact that their mechanical strength, especially their impact strength, is considerably improved, while at the same time they have increased heat resistance.

To demonstrate these improved properties, comparable products of the same molar composition were manufactured using the process of this invention and that of British Pat. 870,095 and the products of the two different processes and their properties were compared with one another.

Polyester-carbonate from 2,2-bis(4-hydroxyphenyl)propane (bisphenol A) and p-hydroxybenzoic acid, manufactured according to the process of British Pat. 870,095

Following the procedure in Example 22 of the British patent, a mixture of 456 g. (2 mols) of bisphenol A and 276 g. (2 mols) of p-hydroxybenzoic acid in pyridine was reacted with 440 g. (4.4 mols) of phosgene, and the reaction product was worked up as described in Example 1 of the British patent, purified and dried. 690 g. (92 percent of theory) of a polyester-carbonate having a relative viscosity of 1.362, measured on a solution of 0.5 g. of product in 100 ml. of methylene chloride at 20° C., were obtained. Film was cast from this product which was also processed on a screw injection molding machine to give standard test rods.

Films cast and standard test rods manufactured by processing on a screw injection molding machine from the product of this invention prepared in Example 1 of this specification were compared with the prior art products; the results are collated in Table 1.

TABLE 1

|  | No. 870,095 | Example 1 |
|---|---|---|
| Solution in methylene chloride | Cloudy | Clear. |
| Film | do | Do. |
| Standard test specimen | do | Do. |
| Impact strength (DIN 53 453) | 18 cm. kp./cm.[2] | Not broken. |
| Notched impact strength (DIN 53 453) | 1-2 cm. kp./cm.[2] | 46 cm. kp./cm.[2],x |
| Flexural strength (DIN 53 453) | 661 kp./cm.[2] | 980 kp./cm.[2]. |
| Glass temperature according to DTA.[3] | 162° C | 180° C. |

[x] Average value.
[3] DTA=differential thermo-analysis.

As mentioned above, the polyester-carbonates of this invention are distinguished by a series of outstanding properties.

The polyester-carbonates represented by Formulae III and IV possess definite structures in which the aromatic dihydroxy radical and the

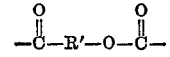

especially the

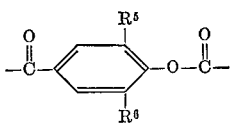

radical alternate. Such a distribution surprisingly results in products which have excellent mechanical properties, such as, for example, notched impact strengths, such as have not hitherto been achievable in co-polycarbonates of comparable halogen content, particularly those prepared from tetrachlorobisphenol and bisphenol A.

The considerably improved properties of the new products may also be attributable to the fact that the products contain 50 percent of ester bonds and 50 percent carbonate bonds in a strict alternating or pair-wise alternating sequence, while the polyester-carbonates manufactured by the process of the British patent are probably built up from block segments of different sizes, each of which contain either only ester groups or only carbonate groups.

Additionally, the polyester-carbonates of this invention are distinguished by their surprisingly good behavior on burning. When a flame is applied to a test specimen of the halogen-containing polyester-carbonate of this invention, an encrustation is produced in the burning zone which prevents dripping of the product and further burning. This is surprising and is a desirable effect in polymers of low inflammability. The polymbers of this invention also possess an excellent stability to saponification and their high glass transition temperature normally exceeds 190° C.

Any possible halogenocarbonic acid ester-carboxylic acid halides of aromatic hydroxycarboxylic acids may be used in the present invention, including, preferably, those of p- and m-hydroxybenzoic acid (which give rise to products in which R' is a p- or m-phenylene radical) and including for example 3 - chloro - 4 - hydroxybenzoic acid, 3,5-dichloro-4-hydroxybenzoic acid, 3-bromo-4-hydroxybenzoic acid, 3,5-dibromo-4-hydroxylbenzoic acid and the like and mixtures thereof. Also, halogenocarbonic acid ester-carboxylic acid halides of other hydroxycarboxylic acids may be used such as dichloro and dibromo derivatives of the hydroxylnaphthalenecarboxylic acids, of (p'- or m'-hydroxyphenoxy)-benzoic acid, of p'- or m'-hydroxydiphenyl-carboxylic acid, of (p'-hydroxyphenylisopropyl)-benzoic acid and the like and mixtures thereof. The chlorocarbonic acid ester-carboxylic acid chlorides are preferred.

The halogenocarbonic acid ester-carboxylic acid halides can be manufactured in good yield, in a manner which is in itself known, by reacting the hydroxycarboxylic acids in homogeneous solution, for example in toluene, chlorobenzene, benzene or some other suitable organic solvent which is inert with respect to the reactants, in the presence of an organic tertiary base, such as N,N-dimethylaniline, quinoline and dimethylcyclohexylamine, with phosgene or other corresponding halogen compounds also of other halogens, at a temperature of −20° to +150° C., and can be purified by distillation.

Any suitable dihydroxy compounds of Formula VI can be used in the present invention including for example, apart from bis-2-(4-hydroxyphenyl)-propane,
4,4'-dihydroxydiphenyl-ether,
4,4'-dihydroxy-diphenyl,
4,4'-dihydroxydiphenyl-sulphide,
4,4'-dihydroxydiphenyl-sulphone,
4,4'-diphydroxybenzophenone,
preferably bis-(4-hydroxyphenyl)-alkanes such as bis-(4-hydroxyphenyl)-methane,
bis-2-(4-hydroxy-3,5-dichlorophenyl)-propane,
bis-2-(4-hydoxy-3,5-dibromo-phenyl)-propane,
bis-2-(4-hydroxy-3,5-dimethyl-phenyl)-propane,
bis-2-(4-hydroxy-3-chlorophenyl)-propane,
bis-3-(4-hydroxy-phenyl)-pentane,
bis-1-(4-hydroxy-phenyl)-cyclohexane.

Polynuclear dihydroxy compounds, such as p-di-[a-(4-hydroxyphenyl)isopropyl]-benzene,
1 - [a - (4 - hydroxyphenyl)isopropyl]-3-[a-(2-hydroxyphenyl)isopropyl]-benzene and the like can also be used. In addition to the p,p'-substituted aromatic dihydroxy compounds mentioned here by way of example, other isomeric dihydroxy compounds, such as 2-(4-hydroxy-phenyl)-2-(2-hydroxy-phenyl)-propane,
bis-2-(2-hydroxy-phenyl)-propane,
4,2'-dihydroxy-diphenyl,
2,2'-dihydroxydiphenyl,
4,2'-dihydroxy-diphenyl-ether,
2,2'-dihydroxy-diphenyl-ether and the like can also be used including any of the dihydroxy compounds within Formula VI listed in U.S. Pats. 2,999,846; 3,153,008; 3.215,668; 3,187,065; 2,970,131; 2,964,794; 2,991,273; 3,094,508; 3,215,667; 3,277,740; 3,248,414; 3,148,172; 3,380,965; 3,014,891; 3,320,211; 3,277,055; 3,280,078; 3,271,268; 3,271,367; 3,261,808; 3,251,803; and the like. Nuclear-halogenated polycarbonates can thereby be preferentially manufactured which possess advantageous rheological properties which are advantageous especially in the case of polymers of high glass temperatures and high softening points.

The process of the invention can be carried out in various ways.

Preferably the polyester-carbonates are prepared by one of two processes which include phase boundary condensation process and a polycondensation in homogeneous phase. If phase boundary condensation is chosen, the polyester-carbonates are obtained by reacting equimolar amounts of the halogencarbonic acid ester-carboxylic acid halide of the Formula V in solution in an organic solvent which is inert with respect to the reactants, for example in a solvent from the series of the chlorinated hydrocarbons or aromatic compounds, with an aqueous solution or suspension of an alkali metal salt of the aromatic dihydroxy compound of the general Formula VI, optionally in the presence of a catalyst such as, for example a tertiary amine, or a quaternary ammonium, phosphonium or arsonium salt, generally at a temperature between −20° and +150° C., preferably between about 0° C. and about +100° C.

Another preferred manufacturing process is polycondensation in a homogeneous phase. Here, a halogenocarbonic acid ester halide of general Formula V dissolved in an organic solvent which is inert with respect to the reactants, for example in methylene chloride, is added, for example, dropwise to an equivalent quantity of the dihydroxy compound (VI) to be used in the practice of this invention, dissolved in the same or a different organic solvent which is inert with respect to the reactants with the addition of an equivalent—referring to the dihydroxy compounds of Formula VI—quantity of a tertiary base. As bases, N,N-dimethylaniline, dimethylcylohexylamine or preferably pyridine, for example, can be used.

Without the use of molecular weight regulators, polymeric products of relative viscosity (measured at 20° C., at a concentration of 0.5 g. of substance in 100 ml. of methylene chloride) significantly above 2, are obtained. The yields are practically quantitative.

Suitable molecular weight regulators are monophenols e.g. methylphenols, ethyl-phenols, propyl-phenols, isopropyl-phenols, butyl-phenols and, especially phenol itself.

The polyester-carbonates thus manufactured can be isolated from the reaction solution either by evaporation and extrusion of the polycondensate, or by precipitation using a suitable precipitant such as methanol, acetone or ligroin.

The polyester-carbonates manufactured according to the invention have relative viscosities of about 1.15 to about >2.0 (measured as a solution of 0.5 g. in 100 ml. of methylene chloride at 20° C.).

The polyester-carbonates of the invention are useful for manufacture of products which are employed at high temperatures and which therefore need high glass transition temperatures.

The invention is further illustrated but is not intended to be limited by the following examples in which all parts and percentages are by weight unless otherwise specified.

EXAMPLE 1

Polyester-carbonate from 2,2 - bis(4 - hydroxyphenyl) propane (bisphenol A) and p-hydroxybenzoic acid (a) Manufacture of the chlorocarbonic acid ester-acid chloride of p-hydroxybenzoic acid.—About 300 parts (3 mols) of phosgene are introduced into a suspension of about 138 parts (1 mol) of p-hydroxybenzoic acid in about 1500 ml. of toluene at about −10° C. while cooling and about 253 parts (2.1 mols) of N,N-dimethylaniline are subsequently added slowly and dropwise at about −5 to about +10° C. with stirring. The reaction mixture is then slowly warmed to about 90° C. over the course of about one hour and stirred at this temperature for a further hour, with nitrogen being passed through simultaneously in order to remove the excess phosgene. After cooling, the mixture is washed with water three times and the organic solution is dried over sodium sulphate. The solvent is distilled off and the residue is fractionated in vacuo.

Yield: 175 g. (80 percent of theory). Boiling point$_{0.1}$ 75–80° C.

$n_{40}^D = 1.5483$.

The distillate slowly solidifies to yield colorless crystals having a melting point of about 30° C. The infrared spectrum confirms the assumed structure.

(b) Polycondensation.—About 438 parts (2 mols) of the chlorocarbonic acid ester-acid chloride of p-hydroxybenzoic acid dissolved in about 1.5 liters of methylene chloride are added dropwise over the course of about 40 minutes at from about 10° to about 20° C. to an intensively stirred mixture of about 3 liters of methylene chloride, about 3 liters of chlorobenzene and a solution of about 456 parts (2 mols) of bisphenol A in about 3.5 liters of aqueous 5 percent strength sodium hydroxide solution (4.4 mols of NaOH). Thereafter about 2.0 ml. of triethylamine were added as the catalyst and the mixture is then stirred for a further about 30 minutes. The phases are separated and the organic polymer solution is washed with water until free of electrolyte. The methylene chloride is distilled from the polymer solution and the viscous solution of the polyester-carbonate in chlorobenzene which is left is evaporated to dryness on metal sheets in a drying cabinet. After comminution and further drying in vacuo at about 100° C., about 725 g. (97 percent of theory) of polyester-carbonate having a relative viscosity of about 1.38 are obtained (measured in methylene chloride solution at about 20° C., 0.5/100 ml.).

EXAMPLE 2

Polyester-carbonate from p-hydroxybenzoic acid and a,a'-(4,4' - dihydroxydiphenyl)-p-diisopropylbenzene (trinuclear bisphenol)

About 35 parts (0.1 mol) of a,a'-(4,4'-dihydroxydiphenyl)-p-diisopropylbenzene dissolved in about 176 ml. of about 5 percent strength aqueous sodium hydroxide solution are reacted as described in Example 1(b) in the presence of about 200 ml. of methylene chloride and 200 ml. of chlorobenzene mixture as the organic phase with about 22 parts (0.1 mol) of the chlorocarbonic acid ester-acid chloride of p-hydroxybenzoic acid in a phase boundary polycondensation with the addition of about 0.5 part of tributylamine as the catalyst. About 47 parts (95 percent of theory) of the corresponding polyester-carbonate having a relative viscosity of about 1.32 are obtained. The product is soluble in methylene chloride, chlorobenzene, cyclohexanone, dimethylformamide and dimethylsulphoxide, and could be processed from solution into films and fibers and from the melt into shaped articles of any desired kind. The glass temperature measured by DTA was 178° C.

EXAMPLE 3

Polyester-carbonate from m-hydroxy-benzoic acid and bisphenol A

A solution of about 22 parts (0.1 mol) of the chlorocarbonic acid ester-acid chloride of m-hydroxybenzoic acid obtained as described in Example 1(a) for p-hydroxybenzoic acid, in about 100 ml. of methylene chloride is slowly added dropwise at about 20° C., while stirring to a solution of about 23 parts (0.1 mol) of bisphenol A in about 500 ml. of anhydrous pyridine. The reaction solution is stirred for a further about 30 minutes and the polycondensate is precipitated by dropwise addition to methanol. After washing and drying, about 28 g. (75 percent of theory) of a polyester-carbonate having a relative viscosity 1.35 are obtained. Glass temperature 148° C. The material could be processed from one of the solvents mentioned in Example 1(b) and also from the melt to give fibers, films and moldings.

EXAMPLE 4

Polyester-carbonate from p-hydroxybenzoic acid and tetrachlorobisphenol A

Following the procedure described in Example 1(b), about 37 parts (0.1 mol) of tetrachlorobisphenol A (2,2-(4,4'-dihydroxy-3,3',5,5' - tetrachloro - diphenyl)-propane) are reacted in a phase boundary polycondensation with about 22 parts (0.1 mol) of chlorocarbonic acid ester-acid chloride of p-hydroxybenzoic acid in methylene chloride and chlorobenzene as the organic phase with the addition of triethylamine as the catalyst. About 43.5 g. (85 percent of theory) of tetrachlorobisphenol-polyester-carbonate are obtained.

Glass temperature 203° C. Relative viscosity: 1.28.

The polycondensate is difficult to ignite and could easily be processed from solution as well as from the melt.

EXAMPLE 5

(Polyester-carbonate from bis-2-(4-hydroxy-phenyl)-propane and 3,5-dichloro-4-hydroxybenzoic acid prepared by the process of this invention)

(a) Manufacture of the chlorocarbonic acid ester-acid chloride of 3,5-dichloro-4-hydroxybenzoic acid.—About 220 parts (∼2.2 mols) of phosgene are introduced during the course of about 2 hours into a suspension of about 207 parts (1 mol) of 3,5-dichloro-4-hydroxybenzoic acid in about 3500 ml. of toluene at about 5° to 15° C. When about 50 parts of phosgene are present in the reaction mixture, the dropwise addition of about 242 parts (2 mols) of N,N-dimethylaniline is started. The speed of dropwise addition is regulated in such a way that at the end of the addition of the phosgene, all the dimethylaniline is present in the reaction mixture. Thereafter the reaction mixture is heated to about 90° C. over the course of about 60 minutes and excess phosgene is expelled with nitrogen. After cooling, the mixture is twice washed with 5 percent strength aqueous hydrochloric acid and three times with water, and the organic solution is dried over sodium sulphate. After the solvent has been stripped off, a distillation of the residue in vacuo yields 255 g. (89 percent of theory) of a colorless liquid (boiling point$_{0.1}$=104° C.).

Saponifiable chlorine—calculated 24.7 percent, found 24.5 percent. The IR-spectrum shows the bands which are characteristic of chlorocarbonic acid ester groups and acid chloride groups.

(b) Polycondensation.—A two-phase mixture consisting of a solution of about 912 parts (4 mols) of bisphenol A and about 24 parts (2 mol percent) of p-tert.-butylphenol in about 782 parts of 45 percent strength sodium hydroxide solution (8.8 mols) and about 16 liters of water, and a solution of about 1152 parts (4 mols) of the chlorocarbonic acid ester-acid chloride of 3,5-dichloro-4-hydroxybenzoic acid in about 16 liters of methylene chloride, is introduced into a reaction vessel. About 20 ml. (1.0 mol percent) of triethylamine are added and the reaction is allowed to take place in the phase boundary with intensive stirring for about one hour. The reaction is slightly exothermic. After completion of the condensation reaction, the phases are separated. The organic phase is washed with acid and subsequently with water until free of electrolyte. After the methylene chloride solution is concentrated, the reaction product is precipitated in methanol. A white powder is obtained which is dried at about 90° C. in vacuo. Yield 1650 g.=92 percent of theory. Films of this material can be cast and standard test rods can be manufactured from this material by processing on a screw injection molding machine. Relative viscosity: 1.302; glass temperature: 204° C. (DTA); total chlorine, calculated 16.0 percent, found 16.0–16.2 percent.

| | |
|---|---|
| Tear strength (DIN 53 455) | [a] 665 kp. cm.$^2$. |
| Tear elongation (DIN 53 455) | [a] 51 percent. |
| E-modulus (DIN 53 455) | [a] 25,000 kp. cm.$^2$. |
| Tensile impact strength (DIN 53 455) | [a] 650 cm. kp./cm.$^2$. |
| Elongation at break (DIN 53 455) | [b] 33 percent. |
| Work absorbed (DIN 53 455) | [b] 23,000 kp. cm.$^2$. |
| Standard notched impact strength (DIN 53 453) | [b] 6 cm. kp./cm.$^2$. |
| Burning test: | |
| According to IBM | [b] A 4 mm./60 sec. |
| According to UL Subject 94 | [b] SE I. |

[a] Measured on films.
[b] Measured on standard test rods obtained by injection molding.

EXAMPLE 6

(Polyester-carbonate from bis-2-(4-hydroxy - 3 - chlorophenyl)-propane and 3,5-dichloro - 4 - hydroxy-benzoic acid)

About 43 parts (0.15 mol) of the chlorocarbonic acid ester-acid chloride of 3,5-dichloro-4-hydroxy-benzoic acid dissolved in about 600 ml. of methylene chloride are reacted with about 42 parts (0.1425 mol) of bis-2-(4-hydroxy-3-chloro-phenyl)-propane dissolved in about 27 parts of 45 percent strength sodium hydroxide solution (0.308 mol) and about 590 ml. of water, in the presence of 1 ml. (2.4 mol percent) of triethylamine, as described in Example 5(b). 69 g. (90 percent of theory) of the corresponding polyester-carbonate are obtained which has a relative viscosity of 1.328 and a glass temperature of 193° C. (DTA).

Total chlorine, calculated 27.7 percent, found 27.5–27.8 percent.

EXAMPLE 7

(Polyester-carbonate from bis - 2 - (4 - hydroxy - 3,5-dichloro-phenyl)-propane and 3,5-dichloro-4-hydroxybenzoic acid)

The instructions given in Example 6 are followed but about 52 parts (0.1425 g.) of bis-2-(4-hydroxy-3,5-dichloro-phenyl)-propane are employed. About 74 parts (85 percent of theory) of the corresponding polyester-carbonate are obtained which has a relative viscosity of 1.274 and a glass temperature of 251° C. (DTA).

Total chlorine, calculated 36.7 percent, found 36.2 percent.

EXAMPLE 8

(Polyester-carbonate from bis - 1 - (4 - hydroxy-phenyl)-cyclohexane (bisphenol Z) and 3,5-dichloro-4-hydroxybenzoic acid)

The instructions given in Example 6 are followed, but a solution of about 38 parts (0.145 mol) of bisphenol Z in about 1100 ml. of water and about 19 parts (0.47 mol) of sodium hydroxide solution was employed. About 65 parts (90 percent of theory) of the corresponding polyestercarbonate are obtained which has a relative viscosity of 1.396 and a glass temperature of 221° C. (DTA).

Total chlorine, calculated 14.7 percent, found 14.7–14.9 percent.

EXAMPLE 9

(Polyester-carbonate from p-di-[-(4-hydroxyphenyl)isopropyl]benzene (trinuclear bisphenol) and 3,5-dichloro-4-hydroxy-benzoic acid)

The instructions given in Example 6 are followed but about 49 parts (0.1425 mol) of trinuclear bisphenol, about 25 parts of NaOH (0.632 mol) and about 1600 ml. of water are employed. 67 g. (80 percent of theory) of the corresponding polyester-carbonate, having a relative viscosity of 1.431 and a glass temperature of 193° C., are obtained.

Total chlorine, calculated 12.7 percent, found 12.8–12.9 percent.

EXAMPLE 10

(Polyester-carbonate from 4,4'-dihydroxydiphenyl-ether and 3,5-dichloro-4-hydroxy-benzoic acid)

The instructions given in Example 6 are followed but about 28 parts (0.1425 mol) of dihydroxydiphenyl-ether are employed. 56.5 g. (91 percent of theory) of the corresponding polyester-carbonate, having a relative viscosity of 1.426 and a glass temperature of 173° C., are obtained.

Total chlorine, calculated 17.05 percent, found 17.0 percent.

EXAMPLE 11

(Polyester-carbonate from bis-2-(4-hydroxy-phenyl)-propane and 3-bromo-4-hydroxybenzoic acid)

(a) Chlorocarbonic acid ester-acid chloride of 3-bromo-4-hydroxy-benzoic acid.—About 87 parts of 3-bromo-4-hydroxybenzoic acid (0.4 mol), suspended in about 800 ml. of toluene are reacted with about 120 parts (1.2 mol) of phosgene in the presence of about 97 parts of N,N-dimethyl-aniline (0.8 mol) as described in Example 5(a). Yield 42.2 g. (35.4 percent of theory). Colorless crystals of melting point 26–29° C., boiling point$_{0.2}$: 110° C.

(b) Polycondensation.—The instructions given in Example 6 are followed but about 15 parts of the chlorocarbonic acid ester-acid chloride of 3-bromo-4-hydroxybenzoic acid (0.05 mol) dissolved in about 200 ml. of methylene chloride and about 11 parts of bisphenol A (0.05 mol), about 75 mg. of p-tert-butylphenol (0.5 mol percent)and about 4 parts of NaOH (0.11 mol) in about 200 ml. of H$_2$O are employed. Yield, 15.8 g. (70 percent of theory) of the corresponding polyester-carbonate, having a relative viscosity of 1.221 and a glass temperature of 167° C. (DTA).

EXAMPLE 12

(Polyester-carbonate from bis-2-(4-hydroxyphenyl)-propane and 3,5-dibromo-4-hydroxybenzoic acid)

(a) Chlorocarbonic acid ester acid chloride of 3,5-dibromo-4-hydroxybenzoic acid.—About 89 parts (0.3 mol) of 3,5-dibromo-4-hydroxybenzoic acid suspended in about 700 ml. of toluene are reacted as described in Example 1(a) with about 90 parts of phosgene (0.9 mol)

in the presence of about 73 parts (0.6 mol) of N,N-dimethylaniline to yield the corresponding acid chloride-chloride-chlorocarbonic acid ester which is a crystalline substance having a melting point of 50° C.

Yield 58 g. (51.3 percent of theory).

(b) Polycondensation.—About 38 parts (0.1 mol) of the acid chloride-chlorocarbonic acid ester of 3,5-dibromo-4-hydroxy-benzoic acid dissolved in about 300 ml. of methylene chloride are polycondensed as described in Example 6 with about 23 parts of bisphenol A (0.1 mol) and about 450 mg. of p-tert.-butylphenol (1.5 mol percent) dissolved in about 400 ml. of water and about 9 parts of NaOH (0.22 mol) in the presence of about 1 m. of triethylamine.

Yield 43.2 g. (81 percent of theory), relative viscosity 1.17, glass temperature 190° C. (DTA).

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. High molecular weight substantially linear polycarbonates obtained by a process which comprises reacting substantially equimolar amounts of a halogenocarbonic acid ester-carboxylic acid halide of an aromatic hydroxy-carboxylic acid of the formula

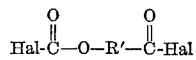

in which Hal is a halogen atom and R' is a divalent aromatic radical, with an aromatic dihydroxy compound of the formula

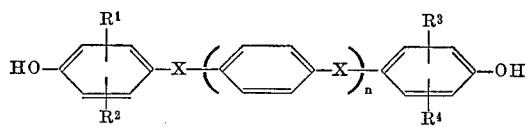

in which $R^1$, $R^2$, $R^3$ and $R^4$ are identical or different and each denotes hydrogen, chlorine or bromine or a $C_1$ to $C_4$ alkyl radical, X is a single bond, or an alkylene, alkylidene or isoalkylidene radical each of which contains one to five carbon atoms, or a cycloalkylene or cycloalkylidene radical each of which contains five to fifteen carbon atoms or C=O, S=O $SO_2$ or an oxygen or sulphur atom and $n$ is 0 or 1, at a temperature between −20° C. and +150° C.

2. High molecular weight linear polyester-polycarbonates of claim 1 in which R' is a p-phenylene- m-phenylene, naphthylene, oxydiphenylene, diphenylene or 4,4'-isopropylidene-diphenylene radical.

3. High molecular weight linear polyester-polycarbonates of claim 1 in which $n$ is 0 and X is an alkylidene radical.

4. High molecular weight linear polyester-polycarbonates of claim 1 wherein said aromatic dihydroxy compound is bis-2-(4-hydroxyphenyl)-propane,
4,4'-dihydroxydiphenyl-ether,
4,4'-dihydroxy-diphenyl,
4,4'-dihydroxydiphenyl-sulphide,
4,4'-dihydroxydiphenyl-sulphone,
4,4'-dihydroxybenzophenone,
bis-(4-hydroxyphenyl)-methane,
bis-2-(4-hydroxy-3,5-dichlorophenyl)-propane,
bis-2-(4-hydroxy-3,5-dibromophenyl)-propane,
bis-2-(4-hydroxy-3,5-dimethyl-phenyl)-propane,
bis-2-(4-hydroxy-3-chlorophenyl)-propane,
bis-3-(4-hydroxy-phenyl)-pentane,
bis-1-(4-hydroxy-phenyl)-cyclohexane,
p-di-[a-(4-hydroxyphenyl)isopropyl]-benzene,
1-[a-(4-hydroxyphenyl)-isopyropyl]-3-[a-(2-hydroxyphenyl)-isopropyl]-benzene,
2-(4-hydroxy-phenyl)-2-(2-hydroxy-phenyl)-propane,
bis-2-(2-hydroxy-phenyl)-propane,
4,2'-dihydroxy-diphenyl,
2,2'-dihydroxyphenyl,
4,2'-dihydroxy-diphenyl-ether, or
2,2'-dihydroxy-diphenyl-ether.

5. The polyester-polycarbonate of claim 1, in which —O—R'— is

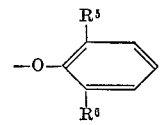

wherein $R^5$ and $R^6$ are hydrogen, chlorine or bromine and may be the same or different with the proviso that at least one substituent of $R^5$ and $R^6$ is chlorine or bromine.

6. The polyester-polycarbonate of claim 5 in which $R^5$ is chloro and $R^6$ is hydrogen; or $R^5$ and $R^6$ are both chloro; or $R^5$ is bromo and $R^6$ is hydrogen; or $R^5$ and $R^6$ are both bromo; or $R^5$ is chloro and $R^6$ is bromo.

7. The polyester-polycarbonate of claim 1 in which $n$ is 0, $R^1$, $R^2$, $R^3$, and $R^4$ are hydrogen, X is an alkylidene radical and —O—R'— is an

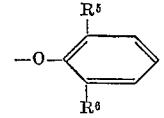

radical, wherein $R^5$ and $R^6$ are hydrogen, chlorine or bromine and may be the same or different with the proviso that at least one substituent of $R^5$ and $R^6$ is chlorine or bromine.

8. The polyester-polycarbonate of claim 7 in which X is isopropylidene.

References Cited

UNITED STATES PATENTS 3,169,121    2/1965    Goldberg _____ 260—47
3,220,976    11/1965    Goldberg _____ 260—47

SAMUEL H. BLECH, Primary Examiner

U.S. Cl. X.R.

260—30.8 DS, 32.6 R, 32.8 R, 33.6 R, 33.8 R, 49, 463